United States Patent Office 3,157,624
Patented Nov. 17, 1964

3,157,624
COPOLYMER OF A STRAIGHT CHAIN OLEFIN
AND A STYRENE
Louis de Vries, Kentfield, and Richard E. Lyle, El Cerrito, Calif., assignors to California Research Corporation, San Francisco, Calif., a corporation of Delaware
No Drawing. Filed June 28, 1961, Ser. No. 120,153
2 Claims. (Cl. 260—88.2)

This invention relates to a new copolymer of improved characteristics. More specifically, it relates to a superior new copolymer made of styrenes and 1-olefins and having improved thickening and oil-solubility characteristics.

Some known prior art copolymers of styrene fail to give desired thickening properties for the reason that they are generally of low molecular weight. Other copolymers of the prior art have not been satisfactory in that they had a very slight oil-solubility, or they could not incorporate in a critical manner the styrene component in polymers in suitable proportion, or they were generally made entirely of 1-olefins which lacked sufficient thickening power. Still other prior art copolymers had no predeterminable molecular weights, and because of this failure no control of properties could be made. In addition, some of the copolymers of styrene are in part insoluble or insufficiently soluble in lubricating oils because of their crystallinity.

According to the present invention, a new and useful product has been obtained which gives thickening characteristics better than those of the known prior art styrene copolymers, and which is readily produced from available low-cost components. The copolymer of the instant invention is composed of styrene and 1-olefin as monomeric constituents. The styrene may be partially or entirely replaced with styrenes substituted with methyl, ethyl, propyl, butyl and amyl groups on the ring. The alpha- or beta-carbon atoms of the vinyl moiety must not be substituted except by hydrogen atoms.

The effective 1-olefins are those containing from about 8 to 25 carbon atoms, 1-olefins containing from 10 to 20 carbon atoms are preferred. Examples of suitable 1-olefins are octene-1, nonene-1, decene-1, undecene-1, dodecene-1, tetradecene-1, hexadecene-1, octadecene-1, eicosene-1, heneicosene-1, tricosene-1, and others available from sources such as cracked paraffin wax.

The polymer may contain from 2.5 to 70% styrene. Below about 2.5% of styrene, the improved viscosity-temperature effect is lost, and the characteristics of the copolymer would be very similar to homopolymers made from 1-olefins. Polymers containing more than 70% of styrene become insoluble in lubricating oils and other oleaginous solids. Copolymers containing less than 50% of styrene are preferred. The molecular weight range of the polymers is of from about 100,000 to about 1,000,000, and preferably above about 125,000.

The copolymers of this invention are useful as lubricating oil additives, fuel additives, paint thickeners, and grease thickeners and as starting materials for polymeric derivatives.

Although the exact mechanism by which the present copolymers act in environments such as lubricating compositions is not known, experimental work has established that certain basic requirements for the styrene-1-olefin copolymer additive as regards composition, structure and physical properties are improved by the method of producing the copolymers. The shear stability, for instance, is influenced by catalysts used in the preparation and the temperature range encountered during the polymerization. Polymers prepared using titanium tetrachloride and triisobutyl aluminum cocatalyst given lesser shear stability than polymers prepared using ARA catalysts with triisobutyl aluminum. (The ARA catalyst is a complex chemical reaction product composition containing 3 mols of titanium trichloride to 1 mol of aluminum chloride according to stoichiometric analysis. It is sold by Stauffer Chemical Company.) This lesser shear stability could be due to the fact that the titanium tetarachloride forms a variety of products, and each solid surface tends to produce polymers of different molecular weights and possibly different character. The titanium tetrachloride tri-isobutyl aluminum cocatalyst system is sensitive to the solvent used in its preparation, as the different solvents will influence the formation of different active surfaces. For this system the saturated aliphatic hydrocarbon can be used, straight-chain alkanes being preferred. Other known trialkyl aluminum compounds may be substituted in place of tri-isobutyl aluminum.

The ARA tri-isobutyl aluminum cocatalyst is insensitive to solvents used in its preparation, and its catalytic activity is apparently due to a relatively straightforward surface reaction. Suitable solvents are commercially available aromatic and saturated aliphatic hydrocarbon solvents. Even with this cocatalyst system, the shear stability and molecular weight of the copolymer is influenced by the change in temperature during the reaction. Consequently, the temperature must be properly controlled. In this cocatalyst system other tri-alkyl aluminum compounds can be substituted in place of tri-isobutyl aluminum. The ARA-tri-isobutyl aluminum cocatalyst is preferred.

Catalysts which are effective for purposes of this invention are selected from the above-mentioned cocatalyst systems. Others, such as vanadium trichloride, straight titanium trichloride, etc., by way of distinction, give essentially zero yields of acceptable copolymers of desired characteristics such as for lubricating oil and fuel additive purposes.

The styrene analyses of the copolymer of the instant invention were determined by conventional method using ultraviolet spectrum and tetrahydrofuran as solvent. Care was taken to remove all possible pure polystyrene side product from the reaction mixture.

The characteristics of the copolymer were evaluated in lubricating oils by means of V.I. (viscosity index) and shear breakdown resistance. Lubricating oil compositions having a low rate of change of viscosity with temperature are highly desirable. Judgment of the suitability of a lubricating oil composition for use or over a wide range of operation temperatures is afforded by the V.I. of the oil which is calculated from the measured viscosities of the lubricating composition of 100° F. and 200° F. by the Standard ASTM Method D 567–41. In this test, lubricating compositions exhibiting the highest V.I. show the least change in viscosity with change in temperature. In the data to follow, the polymer is added to a 1.4% and 2.8% concentration in 150 Neutral Oil, which is a California paraffin base oil of viscosity 150 SSU at 130° F.

The shear stability of the polymer in oil solution was determined by measuring the percent of viscosity loss after a given time according to a standard shear strength determination. This method which duplicates normal shear breakdown forces utilizes an ultrasonic vibrator. The power is set so that a sample of 150 Neutral Oil which is thickened to a viscosity of 60 SSU at 210° F. with a commercial V.I. improver, Acryloid 763 (Acryloid 763 is a mixture of polyalkyl methacrylates wherein the alkyl groups are $C_8$ to $C_{18}$ with an average molecular weight of 400,000), loses 30 to 35% of its original thickening power after 25 minutes. The shear resistance of the polymer to be measured is then determined by placing the polymer sample blended in the same oil to 60 SSU at 210° F. According to this method, identical samples are run in duplicate for twenty minutes with the viscosity determined before and after. The power drift from the above power setting of the ultrasonic vibrator is determined by using RPM 150 Neutral Oil thickened with Acryloid 710 (Acryloid 710 is a mixture of polyalkyl methacrylates wherein the alkyl groups are $C_8$ to $C_{18}$, and the average molecular weight is 220,000) to 60 SSU at 210° F., and which oil normally loses 16 to 19% of its original thickening power. This is done with two samples for twenty minutes with the viscosity determined before and after the actual experiment.

The following examples wherein all parts are by weight unless otherwise stated illustrate, but do not limit, typical copolymers of the present invention.

EXAMPLE 1

*Apparatus.*—The reaction vessel was a standard 2-liter, 3-neck flask equipped with stirrer, nitrogen inlet, thermometer, and reflux condenser. Over the nitrogen inlet, a catalyst preparation flask was rigged. This was a 500-ml. 3-neck flask in the bottom of which had been fixed a wide bore stopcock and 24/40 male ground joint. This flask was equipped with stirrer, nitrogen, inlet and nitrogen outlet system, and rigged so that a plastic bag containing a vial of catalyst could be attached to the nitrogen outlet, filled with nitrogen, the outlet removed, solid catalyst introduced into the flask from the sealed ampule, and the nitrogen outlet tube replaced. Both flasks and all connections were cleaned by heating thoroughly in a rapid stream of nitrogen, before reagents were introduced.

*Procedure.*—The reaction pot was charged with 400 g. of redistilled xylene which had been dried over calcium hydride, 188 g. of dried and distilled dodecene-1, and 12.0 g. of freshly distilled styrene. These materials were thoroughly mixed by bubbling nitrogen through them and heating to 142° C. with stirring. Meanwhile, the catalyst preparation flask was charged with 100 cc. of xylene, and 7.48 g. of ARA catalyst was added via the plastic bag. The stirring was started. Then, 9.35 ml. of tri-isobutyl aluminum was added from a hypodermic syringe through a serum cap fixed above the nitrogen inlet. The catalyst mixture was stirred twenty minutes. At this point the reaction vessel contents were at 142° C. The stopcock on the bottom of the catalyst vessel was opened, and the entire catalyst suspension was dropped rapidly onto the pot contents. Violent boiling ensued, and ice was quickly applied to the reaction vessel. As soon as the violent boiling moderated, the mantle was replaced. The maximum temperature in the pot during this time was 144° C. The pot temperature returned to 141° C. and was held there for one hour using the heating mantle. The catalyst was destroyed by very careful addition of 50 ml. of isopropyl alcohol. The pot was then cooled to room temperature and flooded with methanol. The precipitated polymer was rinsed with methanol, redissolved in benzene, reprecipitated with methanol, then redissolved in benzene, and precipitated with acetone. The final precipitate was dissolved in hexane to give a cloudy white solution. Active charcoal was added, and the solution stirred for an hour and filtered. The filtrate was clear and colorless. It was concentrated and the weight of solution plus polymer was 639 g. A sample of polymer for viscosity, V.I., and shear determination was made by taking 21.88 g. of polymer solution and concentrating to constant weight on a hot plate. Net was 5.60 g. polymer. This was made up to a 2.8% solution in 150 Neutral Oil. This solution had a viscosity at 210° F. of 58.6 SSU, V.I. of 135, and 10.36% viscosity loss in the normal shear determination. The polymer was prepared in 82% yield, based on total weight of monomers, and contained 4.33% styrene. It had a molecular weight of approximately 100,000 as indicated by the viscosity measurements at 210° F.

EXAMPLE 2

*Apparatus.*—A 2-liter, 3-neck flask modified by the addition of a short length of 18 mm. glass tubing so as to accommodate a rubber serum cap through which catalyst could be introduced by a hypodermic syringe into the reaction vessel. This was rigged with reflux condenser, pot thermometer, and nitrogen inlet and outlet tubes, stirrer and dropping funnel.

*Procedure.*—The above pot was charged with 100 cc. of dried and distilled n-heptane. About 7.8 ml. titanium tetrachloride was added through the rubber cap, and the solution was cooled in an ice bath. Stirring was started, and a solution of 22.0 ml. of tri-isobutyl aluminum and 100 ml. of n-heptane was added dropwise, while the temperature of the pot was kept between 2° C. and 8° C. The addition required 13 minutes. A solution of 47.3 g. of dried and freshly distilled styrene and 152.7 g. of dried and distilled dodecene-1 was added. Pot temperature rose from 9° C. to 46° C. The temperature was raised to 50° C. and held there for 6 hours. At the end of this time 400 ml. of n-heptane was added, and the polymer mass was poured into 2 liters of 10% hydrochloric acid in methanol. The polymer-heptane phase was separated and washed twice with 500 ml. of 10% HCl in methanol. The final solution was clear white. This was washed once with methanol after the addition of 200 ml. more n-heptane. The polymer-heptane solution was then boiled on the hot plate to remove excess methanol. The solution was diluted to 3 liters with n-heptane and stirred with active charcoal, filtered, and concentrated. This solution was clear and colorless when cooled to room temperature. Net weight was 629 g. A sample of polymer was prepared for the V.I. determination by adding 26.28 g. of polymer solution to 41 g. 150 Neutral Oil and stripping out the solvent by distillation under reduced pressure. Reweighing showed the polymer solution to have contained 5.36 g. of polymer. Another 145 g. of 150 Neutral Oil was added to bring the solution to 2.8% polymer concentration. This solution had a viscosity at 210° F. of 134 SSU. A 1.4% solution had a viscosity at 210° F. of 72.05 SSU and V.I. of 141. The net yield of polymer was 64.1% based on total weight of monomers. The polymer was found to contain 19.1% styrene. It had a molecular weight of approximately 150,000 as determined by viscosity measurements.

The other mentioned olefins may be prepared in the same manner as the dodecene-1 in the preceding examples. The same conditions and same cocatalysts may be used with the important control of temperature and solvents. Some of the olefins to be used are decene-1, tetradecene-1, hexadecene-1, octadecene-1, eicosene-1, and other 1-olefins in the 8 to 25 carbon atom range or in the preferred 10 to 20 carbon atom range.

The following tables illustrate the important characteristics and superior properties of the copolymers of the instant invention. The examples emphasize that the catalysts and temperature control, as well as the solvents, play a significant part in arriving at the desired styrene and 1-olefin copolymer. The processes carried out were conducted at a high enough catalyst level to surround and intimately contact the polymerization reactants with the catalysts and also to have the beneficial effect of avoiding any water or oxygen that might have accidentally contaminated the apparatus. In the tables to follow, all proportions are by weight unless otherwise indicated. Conversion is based on the total weight of monomers.

*Table I.—Dodecene-Styrene Copolymers*

[Prepared in xylene at 140° C., reaction time of one hour, using an ARA-tri-isobutyl aluminum catalyst prepared in xylene at room temperature]

| Styrene in Feed, Percent | Conversion, Percent | Styrene in Polymer, Percent | Dodecene: Styrene (Mol Ratio) | Viscosity, SSU at 210° F.[1] | Viscosity Index [1] | Shear Loss, Percent |
|---|---|---|---|---|---|---|
| 5.8 | 82 | 4.3 | 14 | 59.8 | 133 | 10.5 |
| 11.0 | 79 | 6.2 | 9 | 58.6 | 135 | 14.3 |
| 23.5 | 70 | 13.1 | 4 | 61.7 | 135 | 14.3 |

USING TiCl$_4$/TIBAl[2] (PREPARED IN DODECANE) DROPPED ONTO MONOMERS+XYLENE AT 140° C. FOR ONE HOUR

| | | | | | | |
|---|---|---|---|---|---|---|
| 11.0 | 6.8 | | | 58.7 | 135 | |

[1] 2.8% polymer in 150 Neutral Oil.
[2] TIBAl=tri-isobutyl aluminum.

As seen from Table I, above, the shear loss of the copolymer is remarkably low in comparison with the commercially available thickeners, such as Acryloids.

The V.I.s are also remarkably superior to Paratone N (a commercial polyisobutylene polymer V.I. improver, marketed by Enjay Company) which, compared with the polymers of Table I, give only a V.I. of 127.

The last experiment in Table I illustrates the low conversion and yield of the TiCl$_4$/TIBAl cocatalyst under high temperature conditions. Dodecene solvent was used in preparation of the last catalyst, as the preferred xylene solvent for ARA/TIBAl cocatalyst system would give practically no results.

tone N is about 130 in comparison with the V.I. of about 140 for the instant products.

In Table III below, the examples illustrate how temperature affects the molecular weight. The viscosity at 210° F. indicates the corresponding molecular weights to be from about 100,000 to about 300,000. It is noted that at lower reaction temperatures the molecular weight of the copolymer is higher. The preferred heptane solvent of the alkane group has been used in the examples below. The amount of solvent can be varied according to the solubility and other mentioned considerations. However, with less solvent present in the reaction zone, styrene component diminishes in the polymer as seen from the last example in Table III. Generally a sufficient amount of solvent is used in order to minimize the influence of this variable on the reaction conditions. However, the weight ratio of solvent to reactants can be

*Table II.—Copolymerization of Styrene and Dodecene-1*

[1.25 Al(i-Bu)$_3$/TiCl$_4$, cold catalyst preparation]

| Solvent | Reaction Temp., °C. | Dodecene/ Styrene, Ratio in Feed | Styrene in Feed, Percent | Conversion at 4 Hours, Percent | Styrene in Polymer, Percent | Dodecene/ Styrene, Mol Ratio | Viscosity, SSU at 210° F.[1] | Viscosity Index [1] |
|---|---|---|---|---|---|---|---|---|
| Heptane | 40 | 3 | 17.1 | 67 | 12.5 | 4 | 73 | 141 |
| Do | 40 | 2 | 23.5 | 64 | 19.1 | 2.6 | 72 | 141 |
| Do | 40 | 1.5 | 29.2 | 29 | 2.9 | 21 | 123 | 140 |
| Benzene | 40 | 1.5 | | 7.6 | 15.7 | 3.3 | 67 | 141 |
| Toluene | 40 | 1.5 | | 11 | 68.4 | 0.3 | 50.5 | 128 |
| Heptane | 0 | 1.5 | | 58 | 32.4 | 1.3 | 141 | 141 |
| Do | 0 | 2 | | 70.5 | 7.0 | 8 | 179 | 140 |

[1] 1.4% polymer in 150 Neutral Oil.

In the above Table II, the examples illustrate how the aromatic solvents influence the incorporation of styrene component into the molecule. The examples also show that if more styrene is used, the reaction is slower and the yields are low. Generally, lower temperatures cause the molecular weights to be higher. The approximate molecular weights as indicated by the viscosities at 210° F. are from about 100,000 to about 600,000 with the high molecular weights for high viscosity values. The V.I. of commercial thickening agent Paravaried from about 5:1 to about 0.5:1 depending on the desired reaction product. The solvents for use in the polymerization reaction zone are solvents inert to the catalysts and are generally saturated aliphatic and aromatic hydrocarbons such as alkanes and mononuclear aromatic compounds.

*Table III.—Molecular Weight Control*

[1.25 Al(i-Bu)$_3$/TiCl$_4$, cold catalyst preparation, heptane solvent]

| Chain Transfer Agent | Reaction Temp., °F. | Dodecene/ Styrene, Ratio in Feed | Conversion at 4 hours, percent | Styrene in polymer, Percent | Dodecene/ Styrene (Mol Ratio) | Viscosity, SSU at 210° F.[1] | Viscosity Index [1] |
|---|---|---|---|---|---|---|---|
| H$_2$ | 0 | 2 | 62 | 9.6 | 6 | 81 | 142 |
| H$_2$ | 0 | 1.25 | 36 | 6.04 | 9 | 111 | 141 |
| H$_2$ | 40 | 2 | 53 | 33.8 | 1.2 | 56 | 135 |
| H$_2$ | 40 | [2]2 | 50 | 21.2 | 2.3 | 62 | 137 |

[1] 1.4% polymer in 150 Neutral Oil.
[2] Lesser amount of Solvent.

As seen from Table II and Table III, the reaction conditions play an important part in preparation of the copolymer. As illustrated in column 1, Table III, the molecular weight can also be controlled by chain transfer agents such as hydrogen.

An advantage of the present invention is that it provides an economical and practical means of greatly improving the efficiency of lubricating oils by means of the oil-soluble styrene 1-olefin copolymers. In addition, the copolymers in the lubricating oils exhibit markedly improved viscosity temperature characteristics over the prior art copolymers. Heretofore, this feature has ordinarily required use of special and expensive additives.

We claim:

1. An oil soluble copolymer compound prepared from (A) of at least one straight-chain 1-olefin of from 10 to 20 carbon atoms and (B) at least one member of the group consisting of styrene and alkyl ring substituted styrenes substituted in aromatic ring with alkyl groups containing 1 to 5 carbon atoms, said copolymer being prepared in the presence of a cocatalyst reaction product of trialkyl aluminum and titanium tetrachloride aluminum chloride complex of stoichiometrical proportions of about 3 mols of titanium trichloride to about 1 mol of aluminum chloride in an inert solvent at a temperature down to at least −10° C., said copolymer having a 1-olefin to styrene mol ratio of from 4 to 14, said copolymer having a molecular weight from about 100,000 to about 1,000,000 as determined by standard viscosity measurements.

2. An oil soluble copolymer compound prepared from straight-chain dodecene-1 and styrene in the presence of a reaction product cocatalyst of tri-isobutyl aluminum and titanium tetrachloride aluminum chloride complex of stoichiometrical proportions of 3 mols of titanium trichloride to 1 mol of aluminum chloride in xylene solvent at about 140° C., having a dodecene to styrene mol ratio of from 4 to 14, a V.I. of at least 133 and a viscosity loss in shear determination at least of less than 15%, and a viscosity at 210° F., in 150 Neutral Oil at a concentration of 2.8% solution at least 58.6 SSU, said copolymer having a molecular weight from about 100,000 to about 1,000,000 as determined by standard viscosity measurements.

References Cited in the file of this patent

UNITED STATES PATENTS

| | | |
|---|---|---|
| 2,603,627 | Garber et al. | July 15, 1952 |
| 2,643,993 | Tegge | June 30, 1953 |
| 2,997,452 | Makowski et al. | Aug. 22, 1961 |

FOREIGN PATENTS

| | | |
|---|---|---|
| 824,460 | Great Britain | Dec. 2, 1959 |

UNITED STATES PATENT OFFICE
CERTIFICATE OF CORRECTION

Patent No. 3,157,624 November 17, 1964

Louis de Vries et al.

It is hereby certified that error appears in the above numbered patent requiring correction and that the said Letters Patent should read as corrected below.

Columns 5 and 6, Table III, heading to second column, for "Reaction Temp., °F." read -- Reaction Temp., °C. --.

Signed and sealed this 13th day of April 1965.

(SEAL)
Attest:

ERNEST W. SWIDER
Attesting Officer

EDWARD J. BRENNER
Commissioner of Patents